Jan. 12, 1926.  1,569,704
J. D. BUCHANAN
SAW FILING ATTACHMENT FOR BUTTON SAWING MACHINES
Filed April 11, 1925   3 Sheets-Sheet 1

Inventor
J. D. Buchanan,
By
Attorney

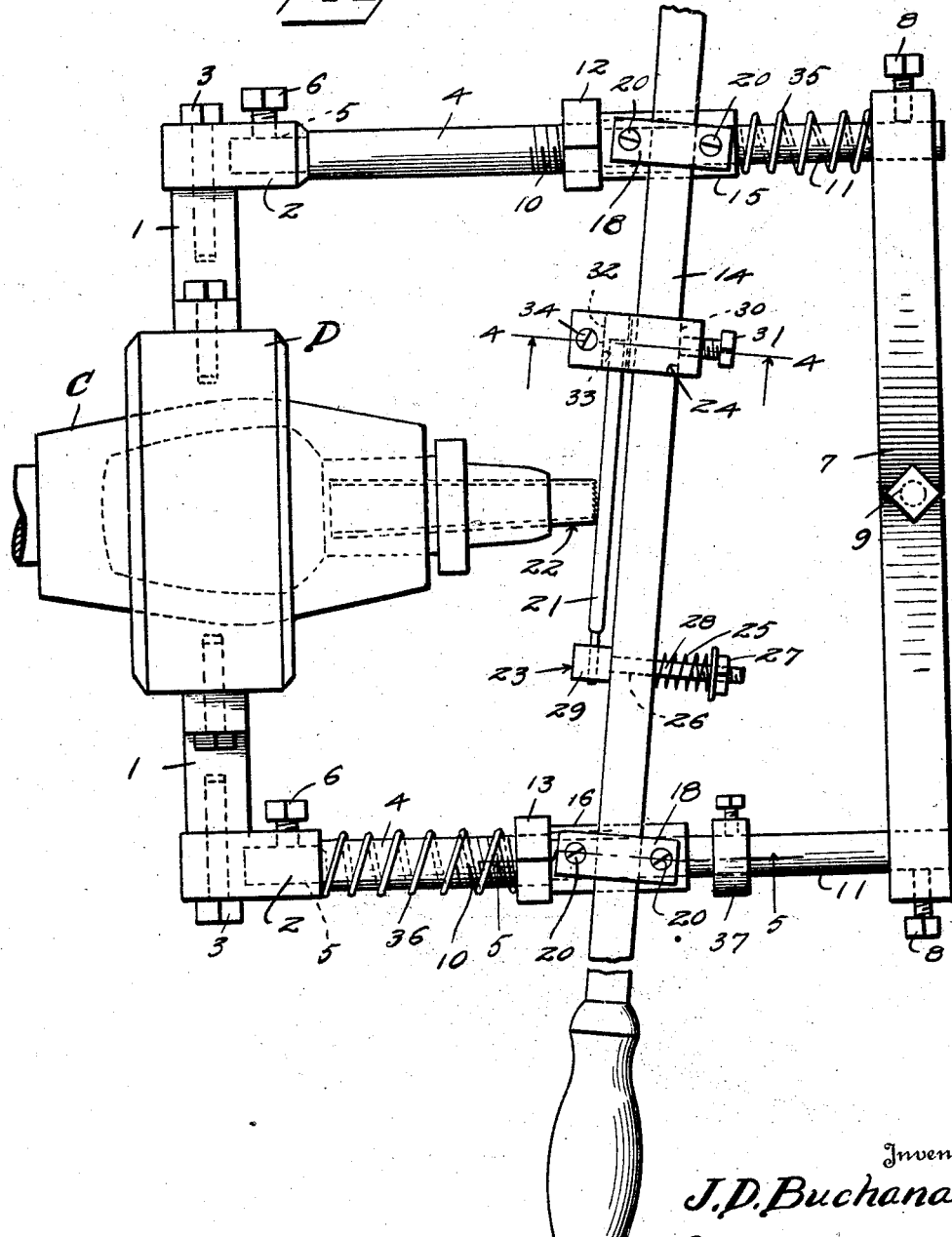

Jan. 12, 1926. 1,569,704
J. D. BUCHANAN
SAW FILING ATTACHMENT FOR BUTTON SAWING MACHINES
Filed April 11, 1925   3 Sheets-Sheet 3
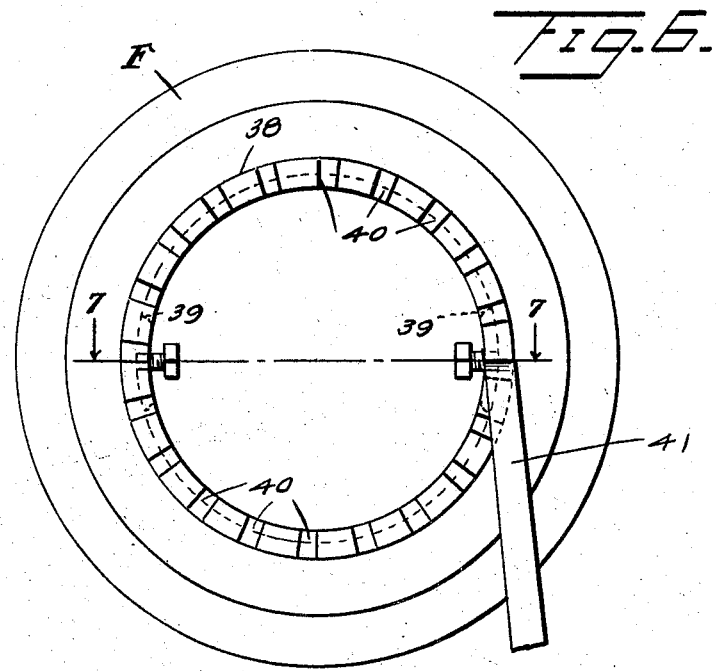
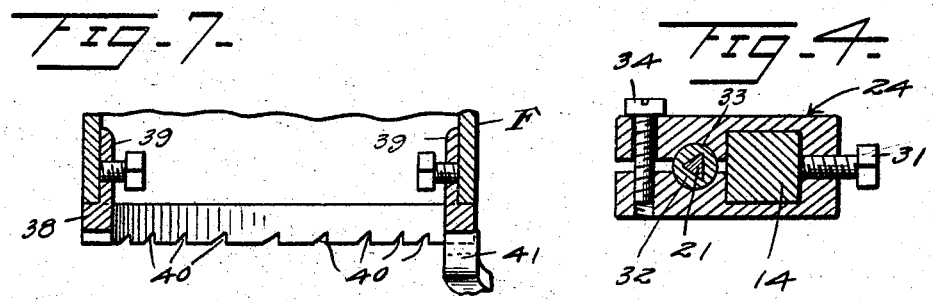
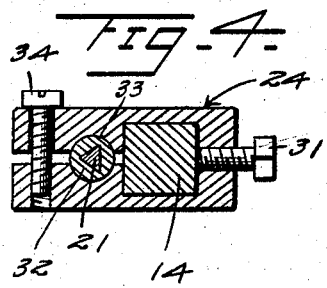
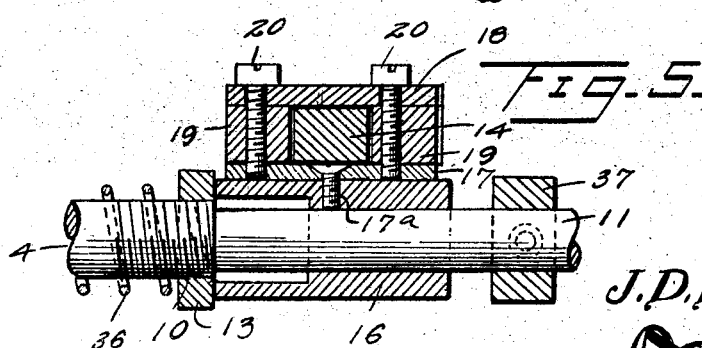
Inventor
J. D. Buchanan.
By
Attorney Patented Jan. 12, 1926.

UNITED STATES PATENT OFFICE.

JAMES D. BUCHANAN, OF IOLA, KANSAS.

SAW-FILING ATTACHMENT FOR BUTTON-SAWING MACHINES.

Application filed April 11, 1925. Serial No. 22,414.

*To all whom it may concern:*

Be it known that I, JAMES D. BUCHANAN, a citizen of the United States, residing at Iola, in the county of Allen and State of Kansas, have invented certain new and useful Improvements in Saw-Filing Attachments for Button-Sawing Machines; and I do hereby declare the following to be a full, clear, and exact description of the invention, such as will enable others skilled in the art to which it appertains to make and use the same.

The invention relates to devices for sharpening the cylindrical saws used in sawing buttons from pearl shell and other like material.

The present method of filing button saws consists in the operator holding the saw arbor steady with his left hand grasping the cone pulley on the arbor and using his right hand to sharpen the teeth of the saw or to form them originally. This operation is unsatisfactory as it is practically impossible to cut the teeth uniform in size or in length or in depth or in pitch and the work that is turned out by these saws is not at all times satisfactory.

Furthermore as the saws are made of thin tempered steel it is necessary to run water on the saw while filing to avoid drawing the temper of the saw, thus making it practically impossible for the operator to see the point of the tooth that is being filed.

This invention has for its object the provision of an attachment for button sawing machines whereby the teeth may be made uniform in length, pitch and size, thus adding to the efficiency of button sawing machines, and reducing the cost of cutting button blanks.

The invention will be described in detail hereinafter and will be found illustrated in the accompanying drawings, in which—

Figure 1:
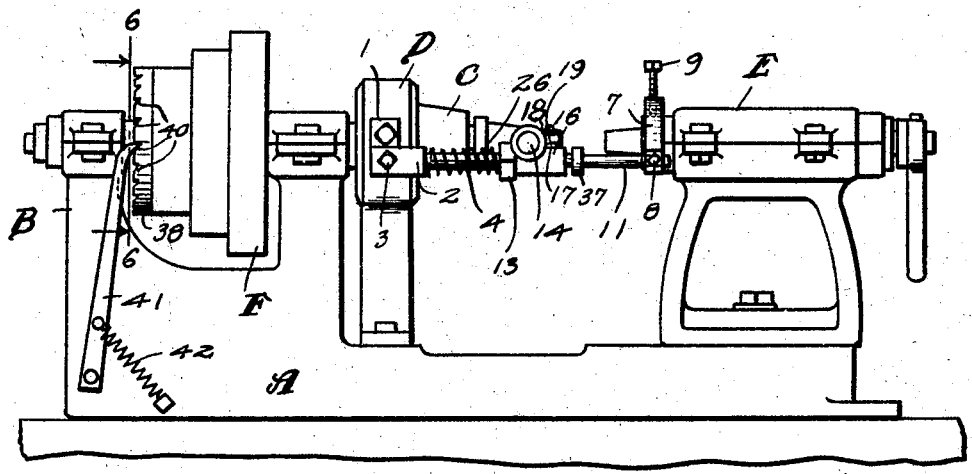
Figure 2:
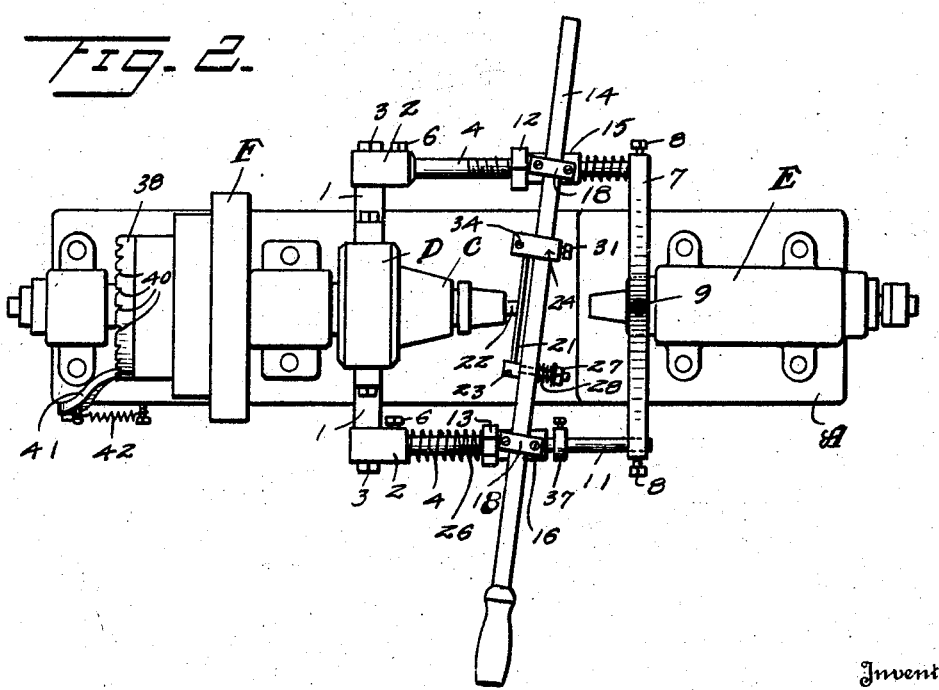

Figure 1 is a side view in elevation of a button sawing machine showing the attachment for filing the saws in place thereon, Figure 2 is a top plan view, Figure 3 a detail view of the filing attachment, Figure 4 a detail sectional view on the line 4—4 of Figure 3, Figure 5 a sectional detail on the line 5—5 of Figure 3, Figure 6 a sectional detail on the line 6—6 of Figure 1, and Figure 7, a section detail on the line 7—7 of Figure 6.

In the drawings similar reference characters will be used to designate corresponding parts throughout the several views.

In Figures 1 and 2 is shown a button sawing machine commonly used for sawing button blanks out of shells or the like material comprising a base A having bearings B for supporting the saw arbor C, D indicating the head stock carrying the saw arbor. E indicates the tail stock also mounted on base A.

Head stock D has laterally projecting arms 1 on which the saw filing attachment is pivotally mounted, said saw filing attachment comprising socket members 2 pivotally mounted on the ends of arms 1 by means of bolts 3. 4 indicates bars having reduced ends secured in sockets 5 of the socket members 2 by means of set screws 6 and secured to the outer end of bars 4 is a cross bar 7 secured thereto by means of set screws 8. Cross bar 7 is as shown of inverted V-shape and when in operative position is seated on the tail stock E as shown in the drawings. 9 indicates a screw engaging the cross bar 7 in its bight to admit of adjusting the height of the attachment relatively to the tail stock as may be found necessary for the proper operation of the device to be hereinafter described.

Bars 4 are threaded as shown at 10 and reduced in diameter at the end of the threaded portion as shown at 11 to receive the cross bar 7. 12 and 13 indicate nuts engaging the threaded portions 10. The saw filing member comprises a bar 14 slidably mounted on bearing sleeves 15 and 16. The construction of sleeves 15 and 16 are identical and one of said sleeves is shown in detail in Figure 5. A guide for bar 14 is mounted on each sleeve 15 and 16, and comprises a plate 17 rotatably mounted on the sleeve by means of a countersunk screw 17ª. 18 indicates a plate spaced from plate 17 by spacing blocks 19, and 20 are screws securing plates 17 and 18 and spacing blocks 19 together.

21 indicates a file for shaping the teeth of the saw designated 22, said file being held in position on the bar 14 by means of clamping members 23 and 24. Clamping member 23 comprises a stem 25 engaging an opening 26 in the bar 14 and yieldingly held in position by means of a nut 27 and coil spring 28. 29 indicates a head on the stem 25 and having an opening therethrough to receive the stem of the file 21. Clamp 24 is provided with a transverse opening 30 to receive the bar 14 and is secured in position thereon by means of set screw 31. The opposite end of the clamp 24 is split and provided with a circular bearing in which is rotatably mounted a circular block 32 having a socket shaped to receive the point of the file 21, said socket being designated 33. It will be understood that the purpose of the circular block 32 is to permit adjustment of the block to provide for filing teeth of different pitches, the block being held in adjusted position by means of an adjusting screw 34.

It will be understood that the purpose of the adjusting nuts 12 and 13 is to regulate the depth of the cut of the file as well as the angle of the tooth. Sleeve 15 is held in engagement with nut 12 by means of a coil spring 35 mounted on the reduced portion of bar 11, said spring also tending to lock the adjusting nut 12 in adjusting position. 36 indicates a spring mounted on bar 4 and engaging adjusting nut 13 to lock it in adjusted position. Sleeve 16 is slidably mounted on the bar 4 and reduced portion 11, a collar 37 that may be adjusted on said reduced portion 11 being provided to limit the outward movement of the sleeve 16.

In order to position the sleeve properly on the saw, a guide member is provided comprising a ring 38 having lugs 39 secured on the inside of the end of the cone pulley F secured to the saw arbor 3 and said ring 38 is provided with notches 40 on its outer edge to correspond to the teeth to be formed on the end of the saw 22. 41 indicates a dog pivotally mounted on the base A to engage the notches 40 in the ring 38 to hold the saw in position while being filed. 42 indicates a spring secured to the base A and engaging a dog 41.

In use it will be apparent that the attachment when the saw is in operation sawing blanks is turned out of the way. When it is necessary to sharpen the saw, the attachment is moved into a horizontal position and the dog moved into engagement with the notched ring 38, the saw arbor being held from rotation by the operator engaging the cone pulley F with his left hand, while with his right hand he actuates the bar 14. The filing of each tooth is begun with the sleeve 16 engaging the collar 37 and as the filing proceeds, the sleeve 16 will slide toward and finally come into engagement with the adjusting nut 13. The bar 14 is then moved back to the original position with the sleeve 16 engaging the collar 37 and with his left hand the operator turns the cone pulley F one notch, the dog 17 sliding freely from one notch to the other and indicating to the operator by a clicking sound when the saw is in proper position for the next filing operation.

It will be apparent that with this attachment the teeth will be filed evenly and that the water, that is necessary to prevent drawing the temper of the saw may be used, as the operator's vision is not required in performing the operation of filing the saw.

What is claimed is:—

1. A saw filing device comprising a frame including threaded bars, guide sleeves slidably mounted on said bars, a file holder carried by said sleeves, a file mounted on the file holder, and nuts threaded on said bars to limit the movement of the guide sleeves thereon.

2. A button saw filing machine comprising threaded bars adapted to pivotally engage a button sawing machine, a cross bar connecting the free ends of said bars, a nut engaging each of said bars, a sleeve slidably mounted on each bar and limited in its movement in one direction by the nut thereon, means to resiliently hold one of said sleeves in engagement with the nut, a collar on the other bar to limit the movement of the sleeve thereon, and a file holder slidably mounted on said sleeves.

3. A button saw filing machine comprising a frame adapted to pivotally engage the head stock of a button sawing machine, said frame consisting of substantially parallel bars and a cross bar, said cross bar adapted to rest on the tail stock of said sawing machine and carrying an adjusting screw to adjust the position of said frame, sleeves mounted to slide on said parallel bars, a file holder slidably mounted on said sleeve, and means to limit the movement of said sleeves on said bars.

In testimony whereof I affix my signature.

JAMES D. BUCHANAN.